United States Patent [19]
Needham

[11] Patent Number: 5,402,152
[45] Date of Patent: Mar. 28, 1995

[54] METHOD AND APPARATUS FOR TAILORING SCROLL BAR AND CURSOR APPEARANCE TO PEN USER HAND ORIENTATION

[75] Inventor: Bradford H. Needham, Hillsboro, Oreg.

[73] Assignee: Intel Corporation, Santa Clara, Calif.

[21] Appl. No.: 175,930

[22] Filed: Dec. 30, 1993

[51] Int. Cl.⁶ .............................................. G09G 5/08
[52] U.S. Cl. .................................... 345/179; 345/146
[58] Field of Search ............... 345/156, 179, 180, 181, 345/182, 183, 146, 126

[56] References Cited

U.S. PATENT DOCUMENTS

| | | | |
|---|---|---|---|
| 5,049,862 | 9/1991 | Dao et al. | 345/179 |
| 5,133,076 | 7/1992 | Hawkins et al. | 395/800 |
| 5,227,614 | 7/1993 | Danielson et al. | 235/380 |

*Primary Examiner*—Jeffery Brier
*Attorney, Agent, or Firm*—Blakely, Sokoloff Taylor & Zafman

[57] ABSTRACT

A method and apparatus for configuring an interface within a pen based computer is disclosed. The user's handwriting style is entered into the computer and the scroll bars and cursor are configured to render command and data entry into the computer more convenient. For the left-hand user, a horizontal scroll bar is placed on the bottom of the display window, a vertical scroll bar is placed on the left side of the display window, and a cursor points up and to the right. For a right-handed user, a vertical scroll bar is placed on the right of the display, a horizontal scroll bar is placed at the bottom of the display window, and a cursor points up and to the left. For a left-hooked user, a horizontal scroll bar is placed at the top of the display window, a vertical scroll bar is placed on the left side of the display window, and a cursor points down and to the right. For a right-hooked user a horizontal scroll bar is placed at the top of the display window, a vertical scroll bar is placed on the right side of the display window, and a cursor points down and to the left.

39 Claims, 4 Drawing Sheets

Right-handed

Left-hooked

Left-handed

Right-hooked

METHOD AND APPARATUS FOR TAILORING SCROLL BAR AND CURSOR APPEARANCE TO PEN USER HAND ORIENTATION

BACKGROUND OF THE INVENTION

1. Field of the Invention

This invention relates to a method in a pen based computing system for arranging various pieces of the user interface to accommodate the hand orientation of the user.

2. Background of the Invention

The traditional method for real time interaction with a computer system has been the keyboard. As long as the keyboard has been used, the handedness of the user has not presented a problem with respect to making a computer easier to use. With the introduction of the mouse as an alternative means for interacting with a computer system, the handedness of the user became an ergonomic concern for computer system designers, but the issues that arose were dealt with relatively easily. In multiple button mouses, the effect each button had could be inverted based on the handedness of the user so that the index finger would always be placed on the button most often pressed. No graphical or on screen alterations were needed to accommodate the special needs of a left-handed computer user.

Recently, however, pen based computers have incorporated the use of a simulated pen device to interact with a computer system. This system of interaction has, for the first time, caused the handedness of the user to become a major consideration in the way the computer displays information. When commands are entered in a pen based computer, the pen is placed on the screen. This pen placement causes the users hand, which is normally holding the pen, to be positioned in front of the display screen where it can obscure certain portions of the display. In some instances, the area being obscured may contain information the user wishes to see while interacting with the system. The layout of the display can, of course, be arranged to minimize the situation where the portion of the screen obstructed contains little useful information. However, the layout that achieves this goal to the greatest degree for one user may not do so for another, differently dexterous user.

The layout of scroll bars in a data display window presents an example of the type of problems encountered when configuring the interface of a pen based computer system. In the past, scroll bars have been located in a horizontal position at the bottom of a display window and in a vertical position on the right side of a display window. For a right-handed pen based computer user this is the optimum position. When data is scrolled either up or down or side to side, his hand only obscures portions of the screen that are outside the display window. A left-handed user will not enjoy the same result. When the left handed user places the pen on the vertical scroll bar located on the right side of the display window, his hand will be located directly above the data being viewed in the display window. The layout that was best for the right handed user is clearly not best for the left handed user.

Additionally, the pen based computer user who hooks his hand while writing, a practice that is not uncommon, will encounter a similar problem. A person who writes with a hooked wrist causes his hand to circle around the area being written on so that his pen points in a downward direction when he writes. Most often it is the left handed user who writes in this manner so that he will be able to see what he is writing more clearly, and so he will not smear the newly written ink as he moves his hand across the page from left to right. When the user who writes with a hooked grip manipulates the horizontal scroll bar located at the bottom of the display window, his hand will undesirably locate in front of the display window.

Another example of the problems pen based computing creates with respect to the dexterity of the user is the orientation of the cursor with respect to the handedness of the user. A right-handed user who holds his hand straight will tend to point to the bottom right-hand side of an object he wishes to manipulate. A cursor with its arrowhead pointed up and to the left is ideal for this situation because it does not obscure the character or word being pointed at. Again, however, for a left-handed person, or a person who writes with a hooked wrist, the tendency is to point at a different corner of a letter or object being manipulated. For this person the cursor pointing up and left obscures the object or text at which the pen is pointed. This creates another inconvenience for the user who does not write with his right hand oriented in a straight position.

BRIEF SUMMARY OF THE INVENTION

It is an objective of this invention to provide a flexible pen based computer user environment that allows users with various writing styles to have a convenient method for entering data and commands.

The invention allows one to indicate his handwriting style to the computer and then have the computer position the scroll bars and cursor in a manner that allows easy manipulation based on that indication. The user may chose one of four handwriting styles. The choices available are left-handed, right-handed, left-hooked and right-hooked. A horizontal scroll bar is placed on the bottom of a display window if the user is left or right-handed, and at the top if he is left or right-hooked. A vertical scroll bar is placed on the right side of the display window if the user is right-handed or right-hooked and the left side if left-handed or left-hooked. The cursor is oriented so that it points away from the corner where the two scroll bars meet.

DETAILED DESCRIPTION OF THE INVENTION

Figure 1:
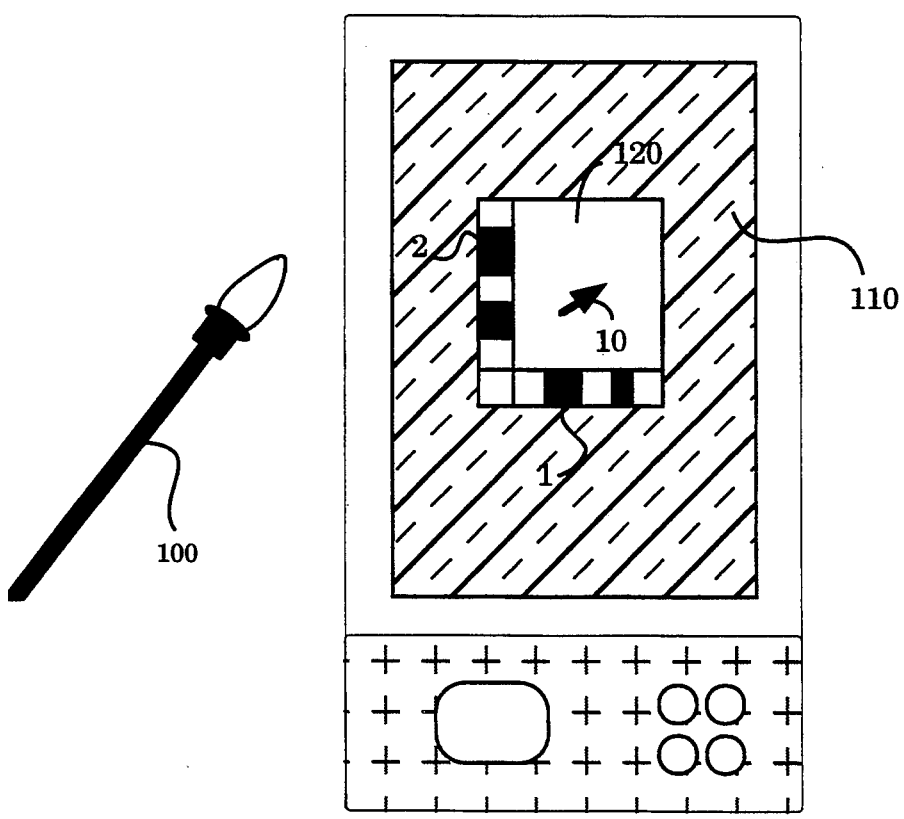
FIG. 1 is diagram of a computer using a pen based interface.

FIG. 1 is an illustration of a pen based computer. To interact with the computer the user places the pen device 100 onto the display screen 110. The display window 120 is shown in the configuration for a left-handed user, with a horizontal scroll bar 1 at the bottom on the display window and a vertical scroll bar 2 on the left side of the display window. The cursor 10 is pointing up and to the right. The computer system senses when and where the pen has been placed on the display screen and takes various actions accordingly.

Figure 2:
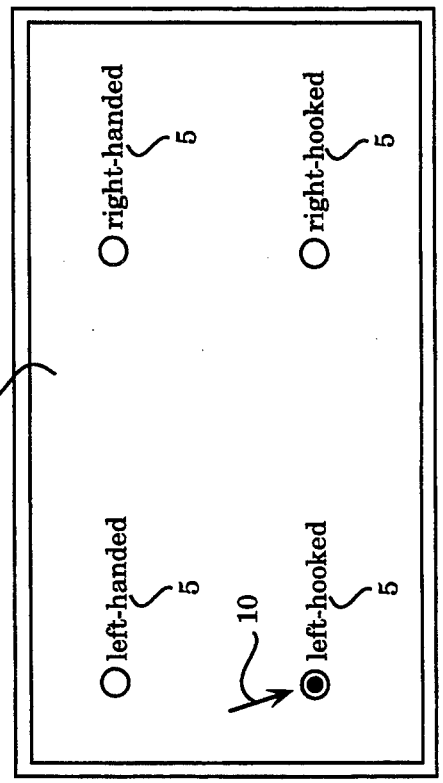
FIG. 2 is an interface box for entering the handedness of the user.

FIG. 2 is an illustration of an interface 4 for entering the user's handedness into the computer. Interface 4 may be displayed within screen 110. By selecting one of the appropriate buttons 5 using pen 100 the user enters any one of four possible writing styles which most closely matches the manner in which he writes. The left-hooked button is shown selected. If the user does not expressly choose the last style selected will be used, or if no style has previously been selected, right-handed will be selected. The choices include left-handed, left-hooked, right-handed and right-hooked. In a preferred embodiment, this information is entered into the system software of the computer. Those skilled in the art will appreciate the various other ways in which this information may be entered, including buttons, dialog windows, menus, and check boxes.

The handedness of the user is communicated to all programs running on the computer either through software, or by setting a bit within the hardware, and causes all windows for data entry and viewing, as well as the cursor, to be altered in a predetermined manner. Other methods of implementation are possible. For example, a single program may incorporate this function without changing the configuration of all other windows being displayed on the system. Those skilled in the art will recognize the various situations in which the invention will be useful and can be implemented.

Once the writing style has been selected, the location of the scroll bars contained in a window for viewing or editing data will be configured based on that selection. FIGS. 3a to 3d show the four possible configurations of the scroll bars. If the user is right-handed horizontal scroll bar 1 is placed at the bottom of the window and vertical scroll bar 2 is placed on the right side of the window as shown in FIG. 3a. This is the traditional placement. When either scroll bar is manipulated the right-handed user's hand will be located to the right or to the bottom of the display window where it will not obscure the user's view of the information being displayed.

Figure 3B:
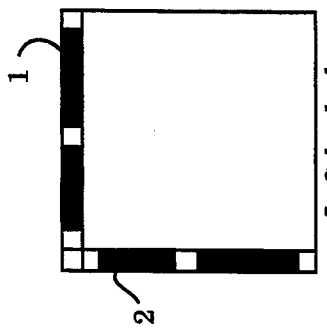
FIGS. 3a–3d show the four different scroll bar orientations and their corresponding user handedness.
Figure 3D:
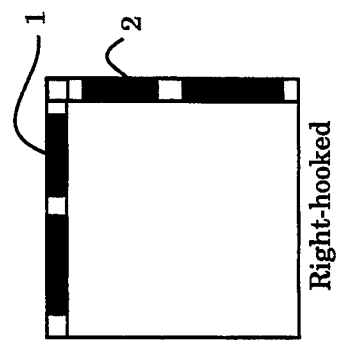
Figure 3A:
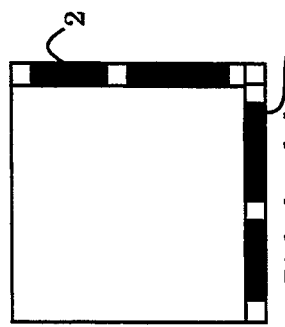
Figure 3C:
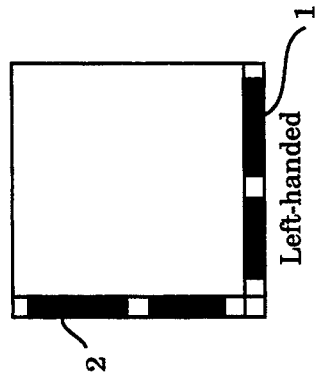

If the user is left-handed, horizontal scroll bar 1 remains at the bottom of the window, but vertical scroll bar 2 is placed on the left side of the window as shown in FIG. 3c. The left-handed user's hand will be located to the bottom or to the left when either scroll bar is manipulated, thus avoiding the situation where the user's hand obstructs the information being displayed.

When the user selects the left-hooked configuration, horizontal scroll bar 1 is placed at the top of the display window and vertical scroll bar 2 is placed on the left side of the window as shown in FIG. 3b. This placement combination prevents the user's hand from obstructing the view of the display window when either scroll bar is used by keeping the user's hand above and to the left of the window during manipulation. Thus, the user may maintain his normal writing style while still being able to manipulate the scroll bars and view the information being displayed.

For the right-hooked user, horizontal scroll bar 1 remains at the top of the display window, but vertical scroll bar 2 is placed on the right side of the display window as shown in FIG. 3d. Because the right-hooked writer keeps his hand above and to the right of the point of the pen, this scroll bar orientation allows the user to manipulate both the horizontal and vertical scroll bars using his normal writing style without obstructing the view of information being displayed.

FIGS. 4a through 4d illustrates the four cursor orientations used in the invention. The cursor is oriented to obscure the least amount of information possible given a user's particular handwriting style. This is accomplished by having the tail of the cursor fall in the direction of the user's hand so that only the area already obscured by the user's hand will be covered by the cursor. Since the user could not see this portion of the display screen, placing the tail of the cursor here does not obscure any additional information from the user's view.

Figure 4D:
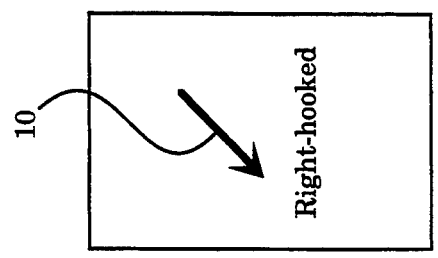
FIGS. 4a–4d show the four different cursor orientations and their corresponding user handedness.
Figure 4C:
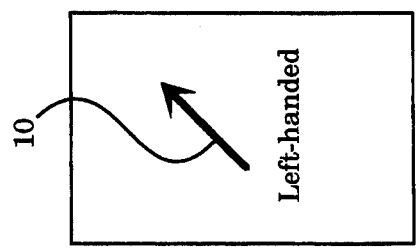
Figure 4B:
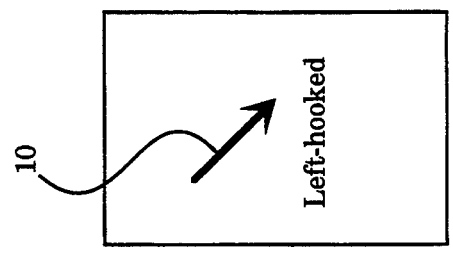
Figure 4A:
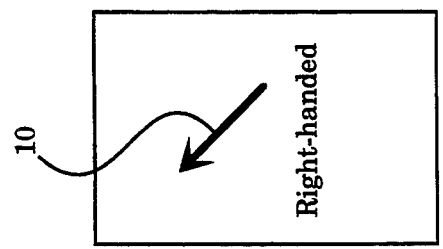

Implementing the strategy of having the tail of the cursor fall under the user's hand results in the four cursor orientations shown in FIGS. 4a through 4d. A right-handed user's hand falls down and to the right of the tip of the pen when the user is writing. The right-handed cursor is accordingly positioned with its stem falling down and to the right from the object at which it is pointing, placing it in the area already obscured from view by the user's hand. A left-handed user's hand falls down and to the left of the tip of the pen. As shown in FIG. 4c, the stem of cursor falls away from the point along the same line. As shown in FIG. 4b, the stem of the cursor falls up and to the left for the left-hooked user corresponding to the orientation of his hand which is located above and to the left of the tip on the pen. And, for the right hooked user, the stem of the cursor points up and to the right, as shown in FIG. 4d, so that the stem falls back under his hand which is located above and to the right of the tip of then pen.

Figure 5:
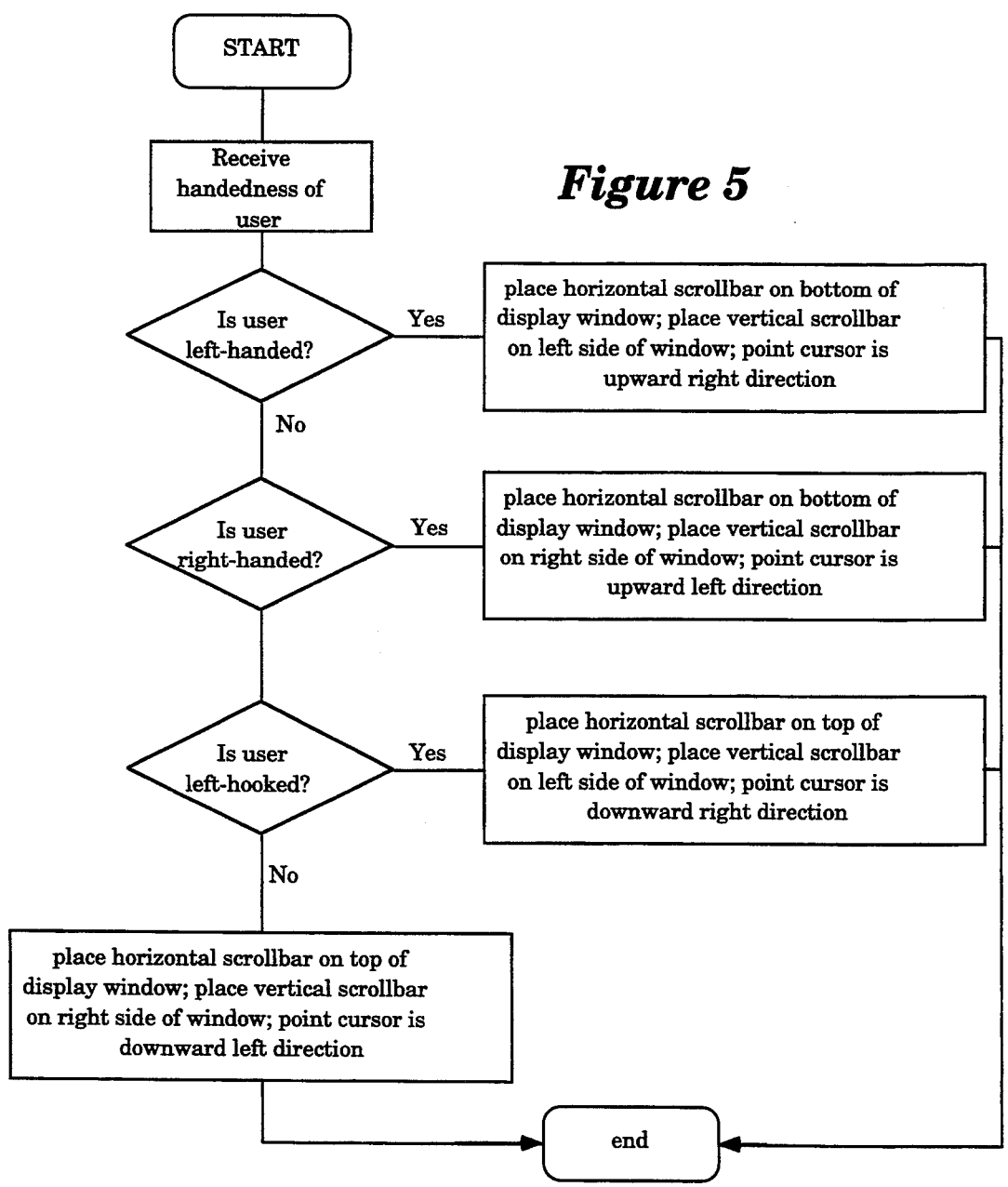
FIG. 5 is a flow chart that illustrates the steps used in implementing the invention.

FIG. 5 is a flowchart illustrating the logic used to orient the scroll bars and cursor. After the system receives the handedness of the user it tests to see if it is one of the three configurations and configures the interface accordingly. If it is not it assures it must be the fourth and configures the screen according to that assumption. It will be recognized that various logic schemes can by utilized to implement the invention, all of which will be alternative embodiments of the invention disclosed herein.

By orienting the horizontal scroll bar, the vertical scroll bar, and the cursor according to applicant's invention, an environment that is user friendly for people with various writing styles is created. In the preferred embodiment the cursor, horizontal scroll bar and vertical scroll bar are positioned according to a selection of one of four types of handedness. Those skilled in the art will recognize that one could choose to modify only one or two of the parameters based on fewer than four types of user handedness. For example, a user could have his choice limited to either left or right handed, and then only the horizontal scroll bar could be placed accordingly. Any number of permutations could be implemented which still incorporate the invention, the spirit and scope of which are set forth in the following claims.

The invention claimed is:

1. A method for configuring an interface to a pen-based computer for a user comprising the steps of:
   a) receiving a handedness for the user;
   b) configuring the interface based on said handedness.

2. A method for configuring an interface to a pen-based computer comprising the steps of:
   a) receiving a handedness for the user; and
   b) placing a vertical scroll bar on the left side of a display window if said handedness of the user is left-handed and placing said vertical scroll bar on the right side of said display window if said handedness of the user is right-handed.

3. A method for configuring an interface to a pen-based computer comprising the steps of:
   a) receiving a handedness for the user; and
   b) orienting a cursor on a display screen to point in a left direction if said handedness of the user is right-handed, or in a right direction if said handedness of the user is left-handed.

4. The method of claim 2 wherein step b) further comprises the step of:
   placing a horizontal scroll bar on the bottom of said display window if said handedness of the user is not hooked, and placing said horizontal scroll bar on the top of said display window if said handedness of the user is hooked;
   where the steps comprising step b) are performed in any order, or simultaneously.

5. A method for configuring an interface to a pen-based computer comprising the steps of:
   a) receiving a handedness for the user; and
   placing a horizontal scroll bar on the bottom of a display window if said handedness of the user is not hooked, and placing said horizontal scroll bar on the top of said display window if said handedness of the user is hooked.

6. The method of claim 3 wherein step b) further comprises the step of:
   orienting said cursor on said display screen to point in an upwards direction if said handedness of the user is not hooked, and downwards direction if said handedness of the user is hooked.

7. An apparatus for configuring an interface to a pen based computer having a user comprising:
   input window means for receiving a handedness for the user; and
   a display means for placing a vertical scroll bar on the left side of a display window if said handedness of the user is left-handed and places said vertical scroll bar on the right side of said display window if said handedness of the user is right-handed.

8. An apparatus for configuring an interface to a pen based computer having a user comprising:
   input window means for receiving a handedness for the user; and
   a display means for orienting a cursor to point in a left direction if said handedness of the user is right-handed, or in a right direction if said handedness of the user is left-handed.

9. The apparatus of claim 7 wherein:
   said display means places a horizontal scroll bar on the bottom of said display window if said handedness of the user is not hooked, and places said horizontal scroll bar on the top of said display window if said handedness of the user is hooked.

10. An apparatus for configuring an interface to a pen based computer having a user comprising:
    input window means for receiving a handedness for the user; and
    a display means for configuring a display window by placing a horizontal scroll bar on the bottom of said display window if said handedness of the user is left-handed or right-handed, and placing said horizontal scroll bar on the top of said display window if said handedness of the user is left-hooked or right hooked.

11. The apparatus of claim 8 wherein:
    said display means orients said cursor to point in an upwards direction if said handedness of the user is not hooked, and in downwards direction if said handedness of the user is hooked.

12. An apparatus for configuring an interface to a pen-based computer for a user comprising:
    a pen for entering a handedness for the user into the pen based computer; and
    a display for configuring a display window located on said display by placing a vertical scroll bar on the left side of said display window if said handedness of the user is left-handed and placing said vertical scroll bar on the right side of said display window if said handedness of the user is right-handed.

13. An apparatus for configuring an interface to a pen-based computer for a user comprising:
    a pen for entering a handedness for the user into the pen based computer; and
    a display for configuring a display window located on said display by orienting a cursor on said display window to point in a left direction if said handedness of the user is right-handed, or a right direction if said handedness of the user is left-handed.

14. An apparatus for configuring an interface to a pen-based computer for a user comprising:
    a pen for entering a handedness for the user into the pen based computer; and
    a display for configuring a display window located on said display by placing a horizontal scroll bar on the bottom of said display window if said handedness of the user is left or right, and placing said horizontal scroll bar on the top of said display window if said handedness of the user is left-hooked or right-hooked.

15. The apparatus of claim 12 wherein:
    said display configures said display window by placing a horizontal scroll bar on the bottom of said display window if said handedness of the user is left-handed or right-handed, and placing said horizontal scroll bar on the top of said display window if said handedness of the user is left-hooked or right hooked.

16. The apparatus of claim 13 wherein:
    said display configures said cursor to point in an upwards direction if said handedness of the user is not hooked and a downwards direction if said handedness of the user is hooked.

17. A pen based computer system having an interface comprising:
    bus means for transferring data;
    input means coupled to said bus means for entering said data;
    memory means coupled to said bus means for storing said data;
    microprocessor means coupled to said bus means, for processing said data;
    input window means for receiving a handedness for a user; and
    a display means for configuring a display window by a vertical scroll bar on the left side of said display window if said handedness of the user is left-handed and placing said vertical scroll bar on the right side of said display window if said handedness of the user is right-handed.

18. A pen based computer system having an interface comprising:
    bus means for transferring data;

input means coupled to said bus means for entering said data;

memory means coupled to said bus means for storing said data;

microprocessor means coupled to said bus means, for processing said data;

input window means for receiving a handedness for a user; and a display means for configuring a cursor located on said display means to point in a left direction if said handedness of the user is right-handed, or in a right direction if said handedness of the user is left-handed.

19. A pen based computer system having an interface comprising:

bus means for transferring data;

input means coupled to said bus means for entering said data;

memory means coupled to said bus means for storing said data;

microprocessor means coupled to said bus means, for processing said data;

input window means for receiving a handedness for a user; and a display means for configuring a display window by placing a horizontal scroll bar on the bottom of said display window if said handedness of the user is not hooked, or on the top of said display window if said handedness of the user is hooked.

20. The pen based computer system of claim 17 wherein:

said display means configures a display window by placing a horizontal scroll bar on the bottom of said display window if said handedness of the user is left-handed or right-handed, and placing said horizontal scroll bar on the top of said display window if said handedness of the user is left-hooked or right hooked.

21. The pen based computer system of claim 18 wherein:

said display means configures said cursor to point in an upwards direction if said handedness of the user is right-handed or left-handed, or in a downwards direction if said handedness of the user is left-hooked or right-hooked.

22. A pen based computer system having an interface comprising:

a bus that transfers data;

a data entry device coupled to said bus that receives said data;

a memory, coupled to said bus, that shares said data;

a microprocessor, coupled to said bus, that processes said data;

an input window for receiving a handedness for a user; and a display screen for configuring a display window located on said display screen by placing a vertical scroll bar on the left side of said display window if said handedness of the user is left-handed and placing said vertical scroll bar on the right side of said display window if said handedness of the user is right-handed.

23. A pen based computer system having an interface comprising:

a bus that transfers data;

a data entry device coupled to said bus that receives said data;

a memory, coupled to said bus, that shares said data;

a microprocessor, coupled to said bus, that processes said data;

an input window for receiving a handedness for a user; and a display screen for configuring a cursor located on said display screen to point in a left direction if said handedness of the user is right-handed, or a right direction if said handedness of the user is left-handed.

24. A pen based computer system having an interface comprising:

a bus that transfers data;

a data entry device coupled to said bus that receives said data;

a memory, coupled to said bus, that shares said data;

a microprocessor, coupled to said bus, that processes said data;

an input window for receiving a handedness for a user; and a display screen for configuring a display window located on said display screen by placing a horizontal scroll bar on the bottom of said display window if said handedness of the user is left or right, and placing said horizontal scroll bar on the top of said display window if said handedness of the user is left-hooked or right-hooked.

25. The pen based computer system of claim 22 wherein:

said display screen configures said display window by placing a horizontal scroll bar on the bottom of said display window if said handedness of the user is left-handed or right-handed, and placing said horizontal scroll bar on the top of said display window if said handedness of the user is left-hooked or right hooked.

26. The pen based computer system of claim 23 wherein:

said display screen configures said cursor to point in an upwards direction if said handedness of the user is right-handed or left-handed, or in a downwards direction if said handedness of the user is left-hooked, or right-hooked.

27. A method for configuring an interface to a pen based computer for a user comprising the steps of:

receiving a handedness for the user;

placing a control region of a display to the right of an information region of said display if said handedness is right-handed, or to the left of said information region if said handedness of the user is left-handed.

28. A method for configuring an interface to a pen based computer for a user comprising the steps of:

a) receiving a handedness for the user;

b) placing a control region of a display above an information region of said display if said handedness is hooked, or below said information region if said handedness is not-hooked.

29. A pen based computer for use with a user comprising:

a pen instrument for entering a handedness for the user; and a display screen for generating a control display region to the right of an information display region located on said display screen when said handedness of the user is right-handed, or to the left of said information display region if said handedness of the user is left-handed.

30. The pen based computer as set forth in claim 29, wherein:
said control display region is associated with said information display region.

31. The pen based computer as set forth in claim 30, wherein:
said information display region is altered by coupling said pen instrument to said control display region.

32. A pen based computer for use with a user comprising:
a pen instrument for entering a writing style of the user; and
a display screen for generating a control display region above an information display region when said writing style is hooked, and below said information display region when said writing style is not hooked.

33. The pen based computer as set forth in claim 32, wherein:
said control display region is associated with said information display region.

34. The pen based computer as set forth in claim 33, wherein:
said information display region is altered by coupling said pen instrument to said control display region.

35. A pen based computer system comprising:
an interface for entering a desired screen configuration into the pen based computer; and
a display for displaying a control display region to the left of an information display region, or to the right of said information display region, depending on said desired screen configuration.

36. The pen based computer system set forth in claim 35, wherein:
said control display region is associated with said information display region.

37. The pen based computer system set forth in claim 35, further comprising:
a pen instrument for altering said information display region when coupled to said control display region.

38. The pen based computer as set forth in claim 35, wherein:
said information display region is a display window.

39. The pen based computer as set forth in claim 38, wherein:
said control display region is a horizontal scroll bar located in said display window.

* * * * *